United States Patent [19]

Heyen et al.

[11] Patent Number: 5,093,918

[45] Date of Patent: Mar. 3, 1992

[54] SYSTEM USING INDEPENDENT ATTRIBUTE LISTS TO SHOW STATUS OF SHARED MAIL OBJECT AMONG RESPECTIVE USERS

[75] Inventors: John G. Heyen, Carrollton; Chander Kasiraj, Grapevine; Timothy J. Wolf, Bedford, all of Tex.

[73] Assignee: International Business Machines Corporation, Armonk, N.Y.

[21] Appl. No.: 288,499

[22] Filed: Dec. 22, 1988

[51] Int. Cl.⁵ .......................................... G06F 13/00
[52] U.S. Cl. .......................... 395/725; 364/264.6; 364/284.4; 364/284.3; 364/940.8; 364/419; 364/DIG. 2
[58] Field of Search ... 364/200 MS File, 900 MS File, 364/419; 340/825.28, 825.52

[56] References Cited

U.S. PATENT DOCUMENTS

| | | | |
|---|---|---|---|
| 4,264,782 | 4/1981 | Konheim | 364/200 |
| 4,283,599 | 8/1981 | Atalla | 235/379 |
| 4,333,144 | 6/1982 | Whiteside | 364/200 |
| 4,375,582 | 3/1983 | Gist | 379/214 |
| 4,410,961 | 10/1983 | Dlugos | 364/900 |
| 4,466,079 | 8/1984 | Daniels et al. | 364/900 |
| 4,476,349 | 10/1984 | Cottrell | 379/214 |
| 4,558,413 | 12/1985 | Schmidt et al. | 364/300 |
| 4,574,284 | 3/1986 | Feldman et al. | 340/825.52 |
| 4,604,686 | 8/1986 | Reiter et al. | 364/200 |
| 4,646,346 | 2/1987 | Emerson | 379/89 |
| 4,713,780 | 12/1987 | Schultz | 364/514 |
| 4,731,750 | 3/1988 | Hoflich | 364/900 |
| 4,754,395 | 6/1988 | Weisshaar et al. | 364/200 |
| 4,769,771 | 9/1988 | Lippmann | 364/200 |
| 4,780,821 | 10/1988 | Crossley | 364/200 |
| 4,783,730 | 11/1988 | Fischer | 364/200 |
| 4,791,560 | 12/1988 | Lahti | 364/200 |
| 4,791,566 | 12/1988 | Sudama | 364/200 |
| 4,800,488 | 1/1989 | Agrawal | 364/200 |
| 4,823,122 | 4/1989 | Mann et al. | 340/825.28 |
| 4,825,354 | 4/1989 | Agrawal | 364/200 |
| 4,851,988 | 7/1989 | Trottier | 364/200 |
| 4,932,026 | 6/1990 | Dev | 370/94.1 |
| 4,985,831 | 1/1991 | Dulong | 364/200 |

Primary Examiner—Thomas C. Lee
Assistant Examiner—Eric Coleman
Attorney, Agent, or Firm—Andrew J. Dillon

[57] ABSTRACT

A method is disclosed for providing a user dependent status indication for shared electronic mail objects within a distributed computing system. In certain electronic mail systems multiple users are permitted to share access to selected electronic mail objects in a so-called "affinity" relationship whereby selected end users are permitted to access identical address space within a computer. Within such systems it is difficult to ascertain a particular status of a selected electronic mail object with certainty due to the face that multiple users may have access to that electronic mail object. In accordance with the method of the present invention an attribute list is associated with each electronic mail object which may contain multiple sets of attributes, each set associated with a group of recipients, a subgroup of recipients or an individual end user having access to that electronic mail object. Thereafter, the activities of each end user are utilized to modify each attribute list associated with that end user. An end user may then periodically determine and display the status of an individual mail object with regard to the entire group of recipients, a subgroup of recipients or an individual end user.

6 Claims, 2 Drawing Sheets

SYSTEM USING INDEPENDENT ATTRIBUTE LISTS TO SHOW STATUS OF SHARED MAIL OBJECT AMONG RESPECTIVE USERS

BACKGROUND OF THE INVENTION

1. Field of the Invention:

This invention relates in general to electronic mail systems and in particular to electronic mail systems which permit multiple end users to share access to an electronic mail object. Still more particularly the present invention relates to methods for providing a user dependent status indication for such shared mail objects.

2. Description of the Related Art

The electronic mail is rapidly supplanting Post Office mail as a means for communicating between individuals. One significant advantage of electronic mail is that the transmission time associated with each electronic mail message is ordinarily only seconds, or fractions of a second, as compared to Post Office mail which ordinarily requires several days.

The mailing time associated with Post Office mail often causes significant delay in the conduct of business and has been largely ignored, and consequently tolerated, until the advent of Express Mail services and electronic mail. Currently, this widespread delay of business is identified as "float" and the minimizing or eliminating of this float has become one goal of business managers, efficiency experts and others hoping to increase societal productivity.

The widespread utilization and increased sophistication of electronic mail systems have given rise to a problem wherein multiple users are permitted to share access to a particular mail object. The difficulty associated with such systems revolves around the inability of end users within the system to determine the status of a particular mail object with regard to a particular end user due to the fact that the mail object may have been accessed by multiple users.

Thus, it should be obvious that a need exists for a method for providing a user dependent status indication suitable for utilization with shared electronic mail objects.

SUMMARY OF THE INVENTION

It is therefore one object of the present invention to provide an improved electronic mail system.

It is another object of the present invention to provide an improved electronic mail system which permits multiple users to share access to a single electronic mail object.

It is yet another object of the present invention to provide an improved electronic mail system which permits multiple users to share access to a single electronic mail object and which provides a user dependent status indication for such shared electronic mail objects.

The foregoing objects are achieved as is now described. In modern electronic mail systems multiple users are sometimes permitted to share access to selected electronic mail objects in a so-called "affinity" relationship wherein more than one user is permitted to access a designated address space within the computer. Within such systems it is difficult to ascertain a particular status of a selected electronic mail object due to the fact that multiple users may have access to that object. In accordance with the method of the present invention an attribute list is associated with each electronic mail object which may contain multiple sets of attributes, each set associated with a group of recipients, a subgroup of recipients or an individual end user. Thereafter, the activities of each end user are utilized to modify each attribute list associated with that end user. An end user may then periodically determine and display the status of an individual mail object with regard to the entire group of recipients, a subgroup of recipients or an individual end user.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
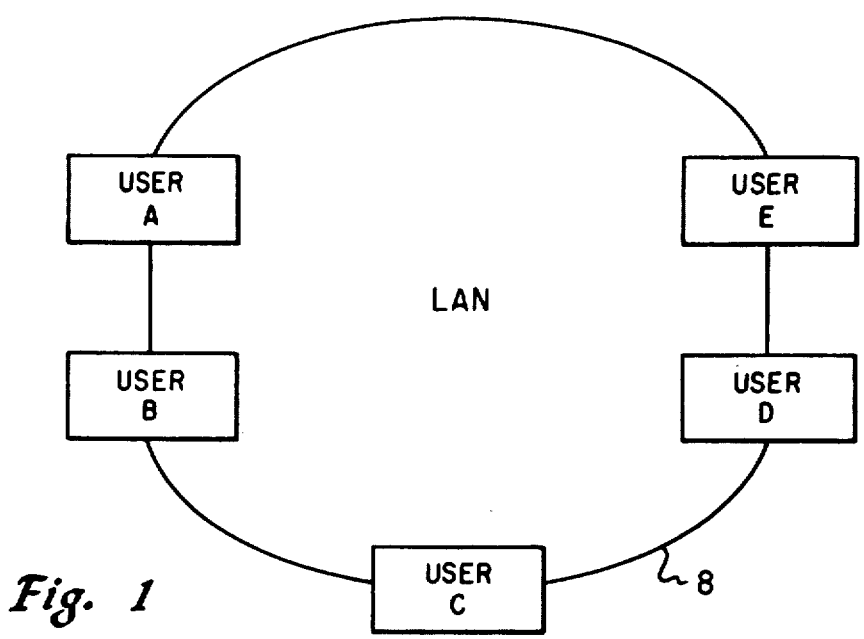
FIG. 1 depicts a block diagram of a distributed computing system which may be utilized with the method of the present invention.

With reference now to the figures and in particular with reference to FIG. 1, there is depicted a block diagram of a distributed computing system which may be utilized with the method of the present invention. As may be seen, distributed computing system 8 comprises a Local Area Network (LAN) which serves to connect a plurality of end users. In this manner Users A, B, C, D and E are all connected together in a manner which will permit the transfer of electronic mail objects. Of course, those skilled in the art will appreciate that other distributed computing systems may be utilized, such as, for example, a Host processor and a plurality of Interactive Work Stations (IWS).

Figure 2:
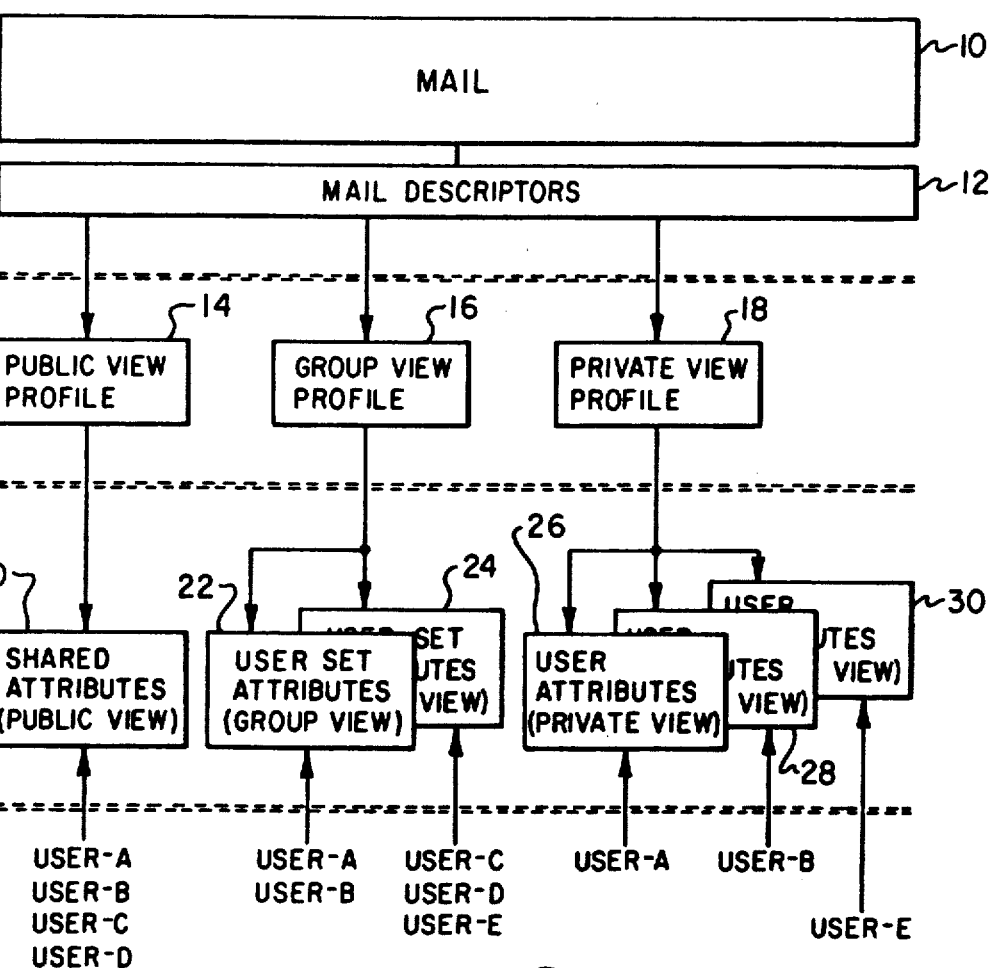
FIG. 2 depicts a block diagram illustrating the different types of multiple status attribute lists associated with the method of the present invention.

Referring now to FIG. 2, there is depicted a block diagram illustrating the different types of multiple status attribute lists associated with the method of the present invention. As may be seen, the process of the present invention is applied upon a receipt of mail 10, which may comprise one or more mail items which have been received from the distributed computing system. Of course, mail 10 may include a group of associated mail descriptors 12 which provide general information concerning mail 10 such as: addressees; folder information; data/time sent and/or received; and, other such information.

Next, in accordance with the method of the present invention a plurality of "view profiles" are established. In the disclosed embodiment of the present invention there are provided three different view profiles, each of which is utilized to aid in the specification of an indication of the status of a shared mail object or a component of a shared mail object with regard to all of the recipients, a subgroup of the recipients or an individual recipient. For example, public view profile 14 is a specific view or profile of a particular electronic mail object which is presented to all users having access to that shared electronic mail object. Naturally, only one public view is permitted per mail object.

Similarly, group view profile 16 may be utilized to aid in the specification of the status of the mail object with regard to certain subgroups of end users specified by the mail object owner. Of course, the mail object owner may not specify any subgroups for a particular mail object so there may be no group view profile in that case. In this manner, the mail object owner may elect to specify selected subgroups of end users for which status may be determined. Finally, private view profile 18 may be defined for any end user having access to a particular shared electronic mail object.

From each view profile defined above, a set of attributes is established and maintained whereby the status of a shared electronic mail object may be determined with regard to all recipients, a subgroup of the recipients or an individual recipient of that mail object. By way of illustration, shared attributes 20 serve to provide the public view of a selected electronic mail object which is visible to Users A, B, C, D and E. Shared attributes 20 will preferably contain status indications such as "New" or "Old", "Opened" or "Unopened" which are perceived by all users having access to the mail object.

The public view attributes associated with shared attributes 20 may also be utilized with user set attributes 22 and 24, in addition to other specific user group attributes, such as action items. Each user set of attributes may be associated with a particular subgroup of end users. As is illustrated, user set attributes 22 are associated with Users A and B and user set attributes 24 are associated with Users C, D, and E.

Finally, user attributes 26, 28, and 30 are each associated with an individual end user and may be utilized to provide a private view of the status of an individual mail object. For example, a mail object may be "Opened" by any user having access; however, the object may not be "Seen" by a user who has not previously opened the mail object. In this manner, the status of a shared electronic mail object may be accurately determined with regard to a particular end user.

In accordance with the method of the present invention, each set of attributes is continually modified by the activities of individual end users in order to update the status of each shared mail object. Additionally, the "status" of a mail object may disclose more than the transmission and receipt status of electronic mail. For example, the user set attributes may be utilized to provide action items which are only visible to a particular set of end users, based upon the nature of the action item. Similarly, user attributes may be utilized to provide personal reminder notes placed by a particular user which are then private to that user and not visible to other users.

Figure 3:
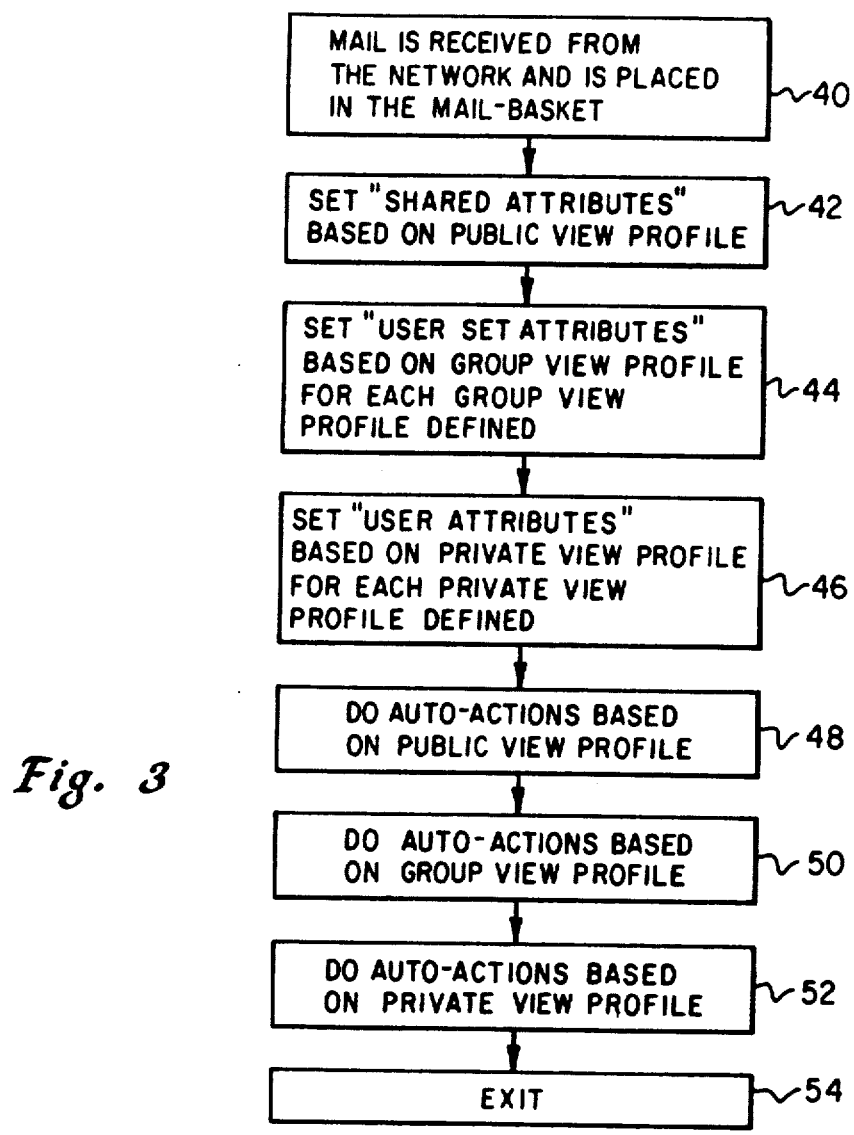
FIG. 3 depicts a logic flowchart illustrating the association of multiple status attribute lists with the receipt of electronic mail objects.

With reference now to FIG. 3, there is depicted a logic flowchart illustrating the association of multiple status attribute lists with the receipt of an electronic mail object. As may be seen, the process begins at block 40 which illustrates the receipt of electronic mail from the network which is placed into the electronic mail-basket of a particular end user within a group of end users. Next, as depicted in block 42, the shared attributes are set based upon the public view profile which is determined by the recipients of the shared mail object. Thereafter, the user set attributes are set based upon any group view profiles which may have been defined by the mail object owner, as described above and as illustrated in block 44. Finally, the user attributes are set, as depicted in block 46. The user attributes are set based upon the private view profile which is established by any end user having access to the shared mail object.

Thereafter, as illustrated in block 48, certain automatic actions may be performed based upon the public view profile. For example, a mail waiting notification may be sent to all affinity users after the receipt of a mail object. Similarly, certain automatic actions based upon the group view profile may be accomplished, as depicted in block 50. One such example may be the placing of action items for a particular defined user set, as defined above. Finally, certain automatic actions may be accomplished based upon the private view profile which has been established, as illustrated in block 52. Thereafter, the process terminates, as illustrated in block 54.

Figure 4:
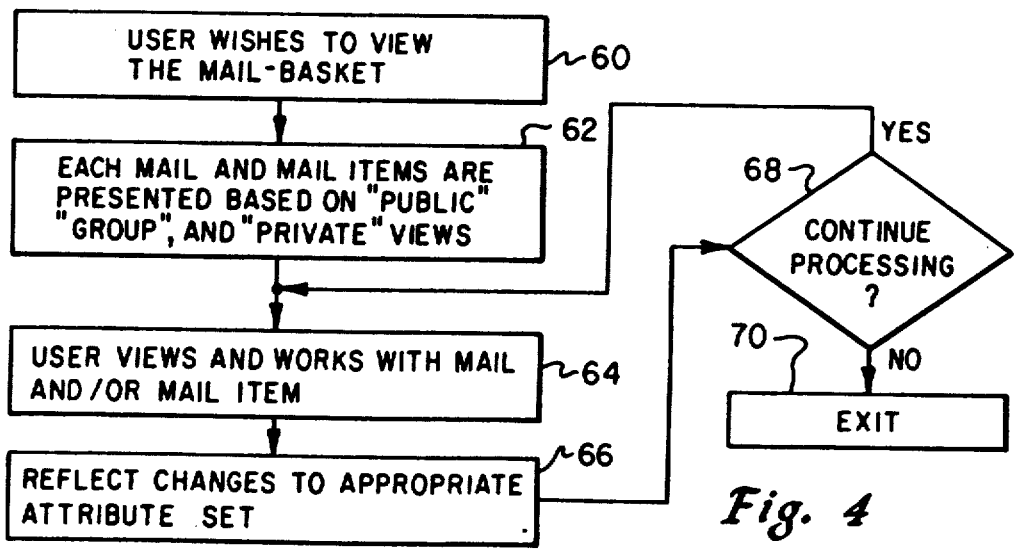
FIG. 4 depicts a logic flowchart illustrating a modification of multiple status attribute lists in response to the activities of an end user in accordance with the method of the present invention.

Referring now to FIG. 4, there is depicted a logic flowchart illustrating the modification of multiple status attribute lists in response to the activities of a particular end user. As may be seen, this process begins at block 60 with the user wishing to view his or her mail-basket. Next, as depicted in block 62, the list of mail objects within the mail-basket is presented to the user based upon the aforementioned public, group and private views. As illustrated in block 64 the user may then view and manipulate any mail object within his or her mail-basket. Automatically, in response to the activities of the user depicted in block 64, each appropriate attribute set for that particular mail object is altered to reflect the change in status brought about by the activities of the end user, as illustrated in block 66. Next, block 68 depicts the determination of whether or not the end user is to continue processing and if so, the process returns to block 64 so that the end user may access and possibly modify a subsequent mail object. In the event the end user elects to discontinue processing, then the process terminates at block 70, as illustrated.

Those skilled in the art will, upon reference to the foregoing specification, appreciate that the applicants have provided a novel and useful method whereby the status of individual shared electronic mail objects may be determined in a user dependent manner. That is, rather than the global status which has previously been possible utilizing known electronic mail systems, the method of the present invention permits individual users to accurately and rapidly determine the status of a particular mail object with regard to all recipients of that mail object, selected subgroups of recipients of that mail object or individual recipients of that electronic mail object.

While the invention has been particularly shown and described with reference to a preferred embodiment, it will be understood by those skilled in the art that various changes in form and detail may be made therein without departing from the spirit and scope of the invention.

We claim:

1. A computer implemented method for use in a distributed computing system for indicating the status of an electronic mail object transmitted by a selected user via said distributed computing system and freely accessible by a plurality of recipients coupled to said computing system, said computer implemented method comprising the steps of:

in response to the receipt of said electronic mail object by said distributed computing system automatically establishing within said distributed computing system a plurality of independent attribute lists each of said plurality of independent attribute lists indicating the status of said electronic mail object with respect to the status of selected activities of an associated recipient or an associated group of recipients having access to said electronic mail object wherein each said recipient and each said associated group of recipients having one of said independent attribute lists;

automatically modifying portions of a selected one of said plurality of independent attribute lists in response to activities with respect to said electronic mail object of a recipient associated with said selected one of said plurality of independent attribute lists;

determining the status of said electronic mail object with respect to a selected recipient by means of an associated modified attribute list; and periodically displaying the status of said electronic mail object within said distributed computing system to indicate the status of said electronic mail object by accessing a selected one of said plurality of independent attribute lists.

2. The method in a distributed computing system for indicating the status of an electronic mail object transmitted by a selected user via said distributed computing system and freely accessible by a plurality of recipients coupled to said distributed computing system according to claim 1, wherein at least one of said plurality of attribute lists comprises a set of attributes containing an indication of the status of said electronic mail object with regard to a single recipient.

3. The method in a distributed computing system for indicating the status of an electronic mail object transmitted by a selected user via said distributed computing system and freely accessible by a plurality of recipients coupled to said distributed computing system according to claim 2, wherein at least one of said plurality of attribute lists comprises a set of attributes containing an indication of the status of said electronic mail object with regard to a selected subset of said plurality of recipients.

4. The method in a distributed computing system for indicating the status of an electronic mail object transmitted by a selected user via said distributed computing system and freely accessible by a plurality of recipients coupled to said distributed computing system according to claim 3, wherein at least one of said plurality of attribute lists comprises a set of attributes containing an indication of the status of said electronic mail object with regard to all recipients having access to said electronic mail object.

5. The method in a distributed computing system for indicating the status of an electronic mail object transmitted by a selected user via said distributed computing system and freely accessible by a plurality of recipients coupled to said distributed computing system according to claim 1, wherein said step of periodically displaying the status of said electronic mail object within said distributed computing system comprises the step of displaying the status of said electronic mail object in response to a selection of said electronic mail object by an end user.

6. A distributed computing system for indicating the status of an electronic mail object transmitted by a selected user via said distributed computing system and freely accessible by a plurality of recipients coupled to said distributed computing system comprising:

means for automatically establishing within said distributed computing system a plurality of independent attribute lists each of said plurality of attribute lists indicating the status of said electronic mail object with respect to the status of selected activities of an associated recipient or an associated group of recipients having access to said electronic mail object in response to receipt of said electronic mail object by said distributed computing system wherein each said recipient and each said associated group of recipients having one of said independent attribute lists;

means connected to said establishing means for automatically modifying portions of a selected one of said plurality of independent attribute lists in response to activities with respect to said electronic mail object of a recipient associated with said selected one of said plurality of independent attribute lists;

means connected to said establishing means for determining the status of said electronic mail object with respect to a selected recipient by means of an associated modified attribute list; and means for periodically displaying the status of said electronic mail object within said distributed computing system by accessing a selected one of said plurality of independent attribute lists.

* * * * *